United States Patent
Murai et al.

(10) Patent No.: US 7,812,252 B2
(45) Date of Patent: Oct. 12, 2010

(54) DYE SENSITIZED SOLAR CELL AND METHOD FOR MANUFACTURING DYE SENSITIZED SOLAR CELL

(75) Inventors: Shinji Murai, Yokohama (JP); Satoshi Mikoshiba, Yamato (JP); Hiroyasu Sumino, Tokyo (JP); Shuji Hayase, Kitakyushu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 920 days.

(21) Appl. No.: 11/671,227

(22) Filed: Feb. 5, 2007

(65) Prior Publication Data
US 2007/0137702 A1 Jun. 21, 2007

Related U.S. Application Data

(62) Division of application No. 10/326,131, filed on Dec. 23, 2002, now Pat. No. 7,196,264.

(30) Foreign Application Priority Data

Dec. 28, 2001 (JP) ............................. 2001-402000

(51) Int. Cl.
*H01L 31/00* (2006.01)
(52) U.S. Cl. .................. 136/263; 429/111; 438/82; 438/85
(58) Field of Classification Search ............. 136/263; 429/111; 438/82, 85
See application file for complete search history.

(56) References Cited

U.S. PATENT DOCUMENTS

| 6,291,763 B1 | 9/2001 | Nakamura |
| 6,376,765 B1 | 4/2002 | Wariishi et al. |
| 6,384,321 B1 | 5/2002 | Mikoshiba et al. |
| 6,686,095 B2 | 2/2004 | Hayase et al. |
| 2001/0023041 A1 | 9/2001 | Hayase et al. |
| 2003/0127130 A1 | 7/2003 | Murai et al. |
| 2003/0164188 A1 | 9/2003 | Murai et al. |
| 2004/0211461 A1 | 10/2004 | Murai et al. |

FOREIGN PATENT DOCUMENTS

| JP | 2002-289273 | 10/2002 |
| KR | 2001-0030478 | 4/2001 |

OTHER PUBLICATIONS

F. Cao, et al., "A Solid State, Dye Sensitized Photoelectrochemical Cell", J. Phys. Chem., vol. 99, pp. 17071-17073 (1995).
W. Kubo, et al., "Fabrication of Quasi-Solid-State Dye-Sensitized $TiO_2$ Solar Cells Using Low Molecular Weight Gelators", Chemistry Letter, pp. 1241-1242 (1998).
K.S. Choi, et al., "Notification for Filing Opinion", Written Opinion from the Korean Intellectual Property Office describing KR 2001-0030478, dated Apr. 26, 2005, 5 pages.

*Primary Examiner*—Jeffrey T Barton
(74) *Attorney, Agent, or Firm*—Oblon, Spivak, McClelland, Maier & Neustadt, L.L.P.

(57) ABSTRACT

The present invention provides a dye sensitized solar cell comprising an n-type semiconductor electrode containing a dye, an opposed electrode, and a gel electrolyte arranged between the n-type semiconductor and the opposed electrode and containing a gelling agent and an electrolyte that contains iodine, wherein the gelling agent contains a compound including an N-containing group and at least one atomic group selected from a group consisting of a sulfonic group and a carboxylic group.

6 Claims, 3 Drawing Sheets

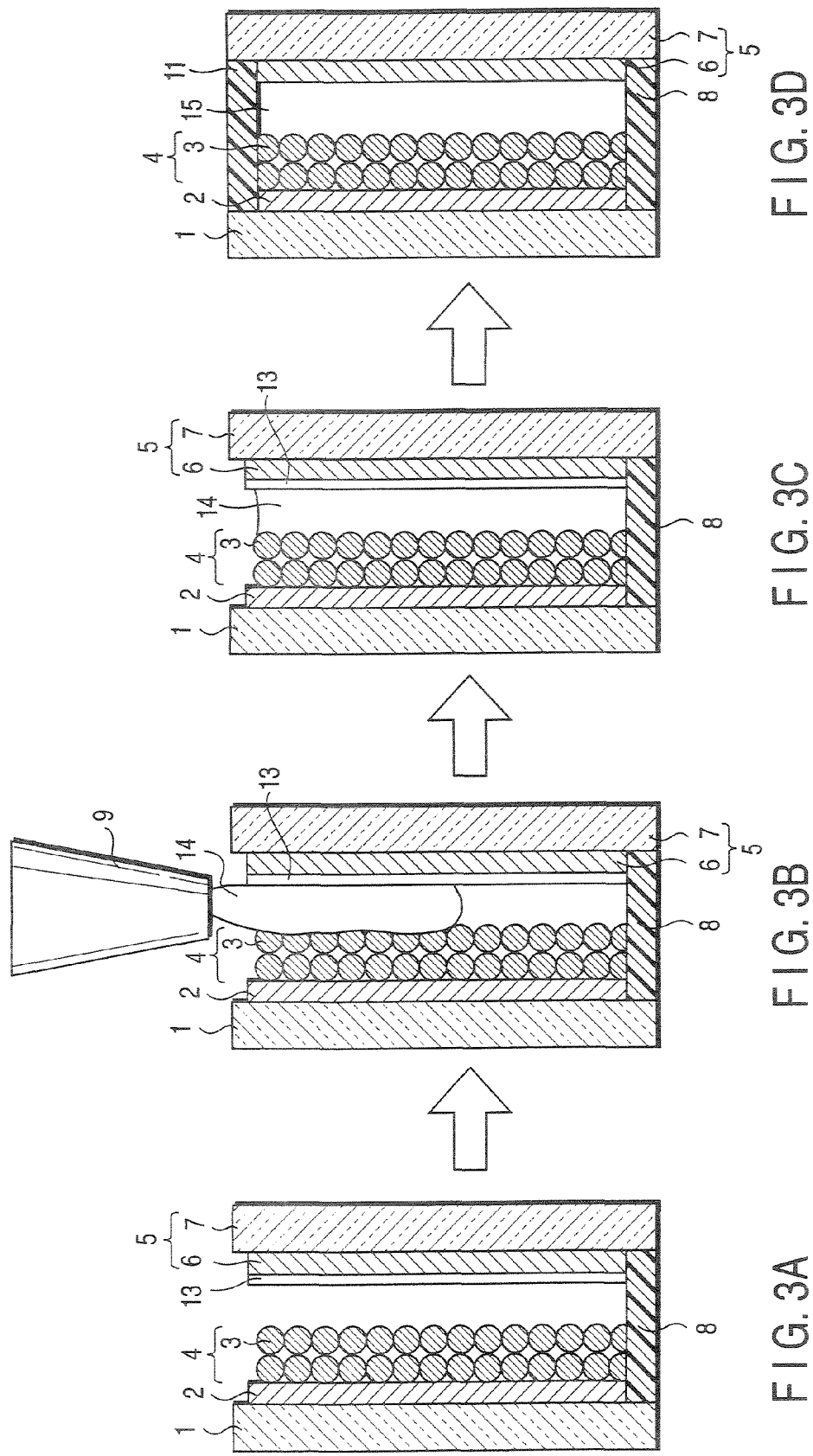

DYE SENSITIZED SOLAR CELL AND METHOD FOR MANUFACTURING DYE SENSITIZED SOLAR CELL

This is a divisional application of U.S. application Ser. No. 10/326,131, filed Dec. 23, 2002.

CROSS-REFERENCE TO RELATED APPLICATIONS

This application is based upon and claims the benefit of priority from the prior Japanese Patent Application No. 2001-402000, filed Dec. 28, 2001, the entire contents of which are incorporated herein by reference.

BACKGROUND OF THE INVENTION

1. Field of the Invention

The present invention relates to a dye sensitized solar cell, and a method for manufacturing the dye sensitized solar cell.

2. Description of the Related Art

The general structure of a dye sensitized solar cell has been described in Jpn. Pat. Appln. KOKAI Publication No. 1-220380. The solar cell comprises an electrode containing a transparent semiconductor layer, which comprises fine particles of a metal oxide on the surface of which a dye is retained, a transparent electrode facing the electrode above, and a fluid carrier movement layer interposed between the electrodes. Such solar cells are called wet type dye sensitized solar cells because the carrier movement layer is a liquid.

A dye sensitized solar cell works through the following process. An incident light from the transparent electrode side arrives at a dye retained on the surface of the transparent semiconductor surface, and excites the dye. The excited dye promptly transfers electrons to the transparent semiconductor layer. The dye, positively charged by donor electrons, is electrically neutralized upon transfer of electrons from ions diffused from the carrier movement layer. The ions that have delivered the electrons are diffused into the transparent electrode so as to recieve electrons. The wet type dye sensitized solar cell works by using the oxide electrode and the opposing transparent electrode as a negative electrode and positive electrode, respectively.

A low molecular weight solvent is used in the wet type dye sensitized solar cell. Sealing should be strictly performed in order to prevent the liquid from leaking. However, it is difficult to maintain such shielding for months or years. Solvent loss due to evaporation of solvent molecules and leakage of the liquid may cause deterioration of the solar cell function, or the environment may be polluted. Considering the above drawbacks, instead of the fluid carrier movement layer, use of a solid electrolyte that manifests ionic conductivity and contains no solvent, or use of a solid organic material that manifests electronic conductivity, has been proposed. Such a solar cell is called a full-solid type dye sensitized solar cell.

Although there is no possibility of leakage of the liquid in these cells, they involve a problem of low energy conversion efficiency, which is thought to be caused by (1) increase of electrical resistance, (2) insufficient contact between $TiO_2$ and electrolytes due to insufficient infusion of the solid electrolyte into interstices among the $TiO_2$ particles, and (3) readily peeled junction interfaces between the semiconductor electrode and solid conductive material during heat cycles because the semiconductor electrode has a different thermal expansion coefficient from that of the solid conductive material.

BRIEF SUMMARY OF THE INVENTION

Accordingly, it is an object of the present invention to provide a material kit for electrolyte compositions for solar cells capable of obtaining a high energy conversion efficiency even at high temperatures.

Another object of the present invention is to provide an electrolyte composition for solar cells capable of obtaining a high energy conversion efficiency even at high temperatures.

Another object of the present invention is to provide a dye sensitized solar cell capable of obtaining a high energy conversion efficiency even at high temperatures, and a method for manufacturing dye sensitized solar cell.

According to a first aspect of the present invention, there is provided a material kit for an electrolyte composition comprising two or more raw materials, and preparing the electrolyte composition by mixing the two or more raw materials, wherein the two or more raw materials comprise an electrolyte containing iodine; an acidic compound containing at least one compound selected from a group consisting of sulfonic acid and carboxylic acid; and a basic compound containing at least one compound selected from a group consisting of aliphatic amines, alicyclic amines, aromatic amines and nitrogen (N)-containing heterocyclic compounds.

According to a second aspect of the present invention, there is provided an electrolyte composition being a mixture, the mixture including:

an electrolyte containing iodine;

an acidic compound containing at least one compound selected from a group consisting of sulfonic acid and carboxylic acid; and a basic compound containing at least one compound selected from a group consisting of aliphatic amines, alicyclic amines, aromatic amines and nitrogen (N)-containing heterocyclic compounds.

According to a third aspect of the present invention, there is provided a dye sensitized solar cell, comprising:

an n-type semiconductor electrode containing a dye;

an opposed electrode; and a gel electrolyte arranged between the n-type semiconductor and the opposed electrode and containing a gelling agent and an electrolyte that contains iodine, wherein the gelling agent contains a compound including an N-containing group and at least one atomic group selected from a group consisting of a sulfonic group and a carboxylic group.

According to a fourth aspect of the present invention, there is provided a dye sensitized solar cell, comprising:

an n-type semiconductor electrode containing a dye;

an opposed electrode; and a gel electrolyte arranged between the n-type semiconductor and the opposed electrode and containing a gelling agent and an electrolyte that contains iodine, wherein the gelling agent includes an organic salt generated by a reaction between an acidic compound and a basic compound, the acidic compound containing at least one compound selected from a group consisting of sulfonic acid and carboxylic acid, and the basic compound containing at least one compound selected from a group consisting of aliphatic amines, alicyclic amines, aromatic amines and nitrogen (N)-containing heterocyclic compounds.

According to a fifth aspect of the present invention, there is provided a method for manufacturing a dye sensitizing solar cell, comprising:

coating a first raw material composition on a surface of an opposed electrode, the first raw material composition including an acidic compound that contains at least one compound selected from a group consisting of sulfonic acid and carboxylic acid;

assembling a cell unit which comprises the opposed electrode and an n-type semiconductor electrode that contains a dye, the surface of the opposed electrode facing the n-type semiconductor electrode;

injecting a second raw material composition containing a basic compound and at least one part of an electrolyte that contains iodine into a gap between the n-type semiconductor electrode and the opposed electrode, the basic compound containing at least one compound selected from a group consisting of aliphatic amines, alicyclic amines, aromatic amines and nitrogen (N)-containing heterocyclic compounds; and obtaining a gel electrode by allowing the first raw material composition to react with the second raw material composition.

According to a sixth aspect of the present invention, there is provided a method for manufacturing a dye sensitizing solar cell, comprising:

coating a third raw material composition including a basic compound on a surface of an opposed electrode, the basic compound containing at least one compound selected from a group consisting of aliphatic amines, alicyclic amines, aromatic amines and nitrogen (N)-containing heterocyclic compounds;

assembling a cell unit which comprises the opposed electrode and an n-type semiconductor electrode that contains a dye, the surface of the opposed electrode facing the n-type semiconductor electrode;

injecting a fourth raw material composition containing an acidic compound and at least one part of an electrolyte that contains iodine into a gap between the n-type semiconductor electrode and the opposed electrode, the acidic compound containing at least one compound selected from a group consisting of sulfonic acid and carboxylic acid; and obtaining a gel electrode by allowing the third raw material composition to react with the fourth raw material composition.

BRIEF DESCRIPTION OF THE SEVERAL VIEWS OF THE DRAWING

FIGS. 3A to 3D are schematic views illustrating the steps for manufacturing a dye sensitized solar cell in Example 16.

DETAILED DESCRIPTION OF THE INVENTION

Figure 1D:
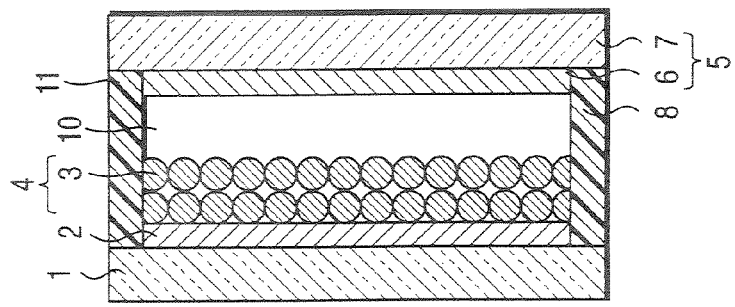
FIGS. 1A to 1D are schematic views illustrating the steps for manufacturing a dye sensitized solar cell in Example 1.

First, examples of a raw material kit for electrolyte composition and an electrolyte composition according to the present invention will be described.

The raw material kit for electrolyte composition comprises two or more raw materials that form the electrolyte composition by mixing. The two or more raw materials comprise an electrolyte containing iodine; an acidic compound containing at least one compound selected from a group consisting of sulfonic acid and carboxylic acid; and a basic compound containing at least one compound selected from a group consisting of aliphatic amines, alicyclic amines, aromatic amines and nitrogen (N)-containing heterocyclic compounds. The two or more raw materials may be independently used, or a part of them may be a mixture. When the mixture is contained in the raw material kit, for example, a raw materiel kit comprising mixture A, in which the acidic compound has been dissolved or dispersed in a part of the electrolyte, and mixture B, in which the basic compound is dissolved or dispersed in the remaining electrolyte, may be used.

The electrolyte composition is a mixture which includes an electrolyte containing iodine, an acidic compound dissolved or dispersed in the electrolyte and containing at least one compound selected from a group consisting of sulfonic acid and carboxylic acid, and a basic compound dissolved or dispersed in the electrolyte and containing at least one compound selected from a group consisting of aliphatic amines, alicyclic amines, aromatic amines and nitrogen (N)-containing heterocyclic compounds.

The electrolyte composition is obtained by mixing the two or more raw materials of the material kit. Mixing is accomplished by the following methods (a) to (f).

(a) A raw material kit in which the electrolyte, acidic compound and basic compound are not mixed is prepared. An electrolyte composition is prepared by dissolving or dispersing the acidic compound and basic compound in the electrolyte.

(b) Raw material composition A is prepared by dissolving or dispersing the acidic compound in a part of the electrolyte, and raw material composition B is prepared by dissolving or dispersing the basic compound in the remaining electrolyte. A raw material kit containing the obtained raw material compositions A and B is stored. The stored material compositions A and B are mixed when necessary to obtain an electrolyte composition. The energy conversion efficiency of the solar cell can be enhanced according to method (b), because gelation speed is slowed as compared with method (a). In other words, when the electrolyte composition prepared by method (b) is injected between the opposed electrode and the n-type semiconductor electrode, gelation may be initiated during the injection step of the electrolyte. Since viscosity of the electrolyte composition increases once the gelation reaction has started, permeation speed of the electrolyte composition into the gap between the electrodes decreases. Consequently, the energy conversion efficiency of the solar cell decreases due to appearance of voids in the gelled electrolyte. When the electrolyte composition is prepared by method (b), the viscosity of the electrolyte composition is suppressed from increasing during the injection step, and the permeation speed of the electrolyte composition into the gap between the electrodes may be increased to enable the energy conversion efficiency of the solar cell to be enhanced.

(c) An opposed electrode comprising a substrate and a conductive film held on the substrate is prepared. A first raw material composition containing the acidic compound is coated on the surface of the conductive film on the opposed electrode. Further, the basic compound is dissolved or dispersed in at least one part of an electrolyte containing iodine to prepare a second raw material composition. The surface of the opposed electrode coated with the first raw material composition is allowed to face the n-type semiconductor electrode retaining a dye, and the second raw material composition is injected into the gap between the surface of the n-type semiconductor electrode and the surface of the opposed electrode coated with the first raw material composition, thereby obtaining an electrolyte composition.

It is possible for the electrolyte to be divided into two. For example, a part of the electrolyte (hereinafter called first electrolyte) is contained in first raw material composition, and a remaining electrolyte (hereinafter called second electrolyte) is contained in the second raw material composition. In this case, it is desirable to prepare the first raw material composition by dissolving the acidic compound in the first electrolyte. The composition of the first electrolyte may be the same as or different from the composition of the second electrolyte.

(d) The opposed electrode on which the first raw material composition is coated as described in (c), and the second raw material composition are prepared as a raw material kit, and they are respectively stored. The surface of the opposed electrode coated with the first raw material composition is made to face the n-type semiconductor electrode retaining a dye, and the second raw material composition is injected into the gap between the surface of the n-type semiconductor electrode and the surface of the opposed electrode coated with the first raw material composition, thereby obtaining an electrolyte composition.

(e) An opposed electrode comprising a substrate and a conductive film held on the substrate is prepared. The surface of the conductive film of the opposed electrode is coated with a third raw material composition containing the basic compound. The acidic compound is dissolved in at least one part of the electrolyte containing iodine to prepare a fourth raw material composition. The surface of the opposed electrode coated with the third raw material composition is made to face the n-type semiconductor electrode retaining the dye, and the fourth raw material composition is injected into the gap between the surface of the n-type semiconductor electrode and the surface coated with the third raw material composition, thereby obtaining an electrolyte composition.

It is possible for the electrolyte to be divided into two. For example, a part of the electrolyte (hereinafter called first electrolyte) is contained in third raw material composition, and a remaining electrolyte (hereinafter called second electrolyte) is contained in the fourth raw material composition. In this case, it is desirable to prepare the third raw material composition by dissolving the basic compound in the first electrolyte. The composition of the first electrolyte may be the same as or different from the composition of the second electrolyte.

(f) The opposed electrode coated with the third raw material composition described in (e), and the fourth raw material composition are prepared as a raw material kit, and they are respectively stored. The surface of the opposed electrode coated with the third raw material composition is made to face the n-type semiconductor electrode retaining a dye, and the fourth raw material composition is injected into the gap between the surface of the n-type semiconductor electrode and the surface coated with the third raw material composition, thereby obtaining an electrolyte composition.

The components constituting the electrolyte composition are described in detail below.

(Carboxylic Acid)

Carboxylic acids having at least one carboxylic group in one molecule can be used. Examples of the carboxylic acid include formic acid, acetic acid, lactic acid, propionic acid, butyric acid, dimethylol propionic acid, N-acetyl glycine, N-acetyl-β-alanine, aromatic dicarboxylic acids such as phthalic acid and isophthalic acid, adipic acid, aliphatic dicarboxylic acids such as azelaic acid and tetrahydrophthalic acid, and tricarboxylic acids such as trimellitic acid.

Polymers containing carboxylic acid may be used as the carboxylic acid. Examples of them include polyacrylic acid, polymethacrylic acid, and alkyl(meth)acrylate such as poly[carboxyethyl(meth)acrylate] and poly[carboxypropyl(meth)acrylate]. Also included are polymers between ethylenic unsaturated monomers, which contain the carboxylic group such as acrylic acid, methacrylic acid and crotonic acid, and monomers such as methyl methacrylate, ethyl methacrylate and styrene. Further, the polymer may be a homopolymer obtained by polymerization of a single monomer, or a copolymer obtained by polymerization of at least two kinds of monomers. The copolymer may be a random copolymer or a block copolymer.

The polymer containing the carboxylic acids preferably has a weight average molecular weight in the range of 500 to 1,000,000 for the following reasons. The polymer containing carboxylic acid may be insoluble in the electrolyte if the molecular weight is larger than 1,000,000. If the molecular weight is less than 500, gelation may be difficult when the molecular weight of the basic compound is small. Accordingly, the molecular weight is more preferably in the range of 1000 to 300,000.

One or more kinds of the carboxylic acid may be used.

Decomposition reactions of the dye retained on the n-type semiconductor electrode can be suppressed due to a lower acidity of the carboxylic acid than that of sulfonic acids. Consequently, the solar cell can provide at a higher voltage, as compared with a solar cell using sulfonic acid, thus the energy conversion efficiency of the solar cell is improved. Also, carboxylic acid has an advantage over sulfonic acid in that the solubility of carboxylic acid is higher.

The carboxylic acids having long chain alkyl groups in their molecular frame or side chains can suppress gelation of the electrolyte composition, particularly at room temperature, due to their low compatibility with the electrolyte. When the reaction area of the electrode is increased for attaining a high capacity, the electrolyte composition may be gelled during the step for permeating the electrolyte composition into the electrode due to the high gelation speed at room temperature. This prevents further permeation of the electrolyte composition, thereby arising a possibility of non-uniform distribution of the gelled electrolyte. However, gelation in the step for allowing the electrolyte composition to permeate may be avoided by suppressing gelation at room temperature, even when the reaction area of the electrode is increased. Consequently, gelation may be accelerated by heat treatment after allowing the electrolyte composition to permeate into the entire region of the electrode, thereby enabling the gelled electrolyte to be uniformly distributed even when the reaction area of the electrode is increased. Gelation of the electrolyte composition, containing the long chain alkyl groups in the frame or side chains, may be accelerated by heat treatment at 50 to 200° C.

Substituted or non-substituted hydrocarbon groups having 8 to 30 carbon atoms are desirably used as the long chain alkyl group. At least one long chain alkyl group may be contained, or two or more long chain alkyl groups may be contained. Examples of the hydrocarbon groups available include branched or linear substitution groups such as octane, nonane, decane, undecane, dodecane, tridecane, tetradecane, pentadecane, hexadecane, heptadecane, octadecane, nonadecane, eicosane, heneicosane, docosane, tricosane, tetracosane, pentacosane, hexacosane, heptacosane, octacosane, nonacosane and triacosane, and compounds having a steroid frame such as cholesterol.

While preferable examples of the carboxylic acids having the long chain alkyl groups at the frame or side chains are described below, the present invention is not restricted thereto. The examples of long chain fatty acids include saturated fatty acids such as stearic acid and lauric acid, unsaturated fatty acids such as oleic acid and myristic acid, and natural oils such as caster oil, palm oil and soybean oil and derivatives thereof, as well as hexadecane dicarboxylic acid, octadecane dicarboxylic acid and eicosane dicarboxylic acid.

(Sulfonic Acid)

Sulfonic acids have an advantage of excellent heat resistance as compared with carboxylic acids.

Examples of the sulfonic acids include benzenesulfonic acid, dodecylbenzene sulfonic acid, methaxylene sulfonic acid, polyvinylbenzene sulfonic acid and perfluorocarbon sulfonic acid. One kind or two or more kinds of the sulfonic acids may be used. (Aliphatic amines, alicyclic amines, aromatic amines and nitrogen (N)-containing heterocyclic compounds)

Examples of aliphatic amines belonging to monoamines include methyl amine, ethyl amine, propyl amine, isopropyl amine, butyl amine, amyl amine, hexyl amine, octyl amine, nonyl amine, lauryl amine, dimethyl amine, diethyl amine, dipropyl amine, diisoproyl amine, dibutyl amine, diamyl amine, trimethyl amine, triethyl amine, tripropyl amine, tributyl amine and triamyl amine. One kind or two or more kinds of aliphatic amines may be used.

Examples of the alicyclic amines available belonging to the monoamines include cyclopropyl amine, cyclobutyl amine, cyclopentyl amine and cyclohexyl amine. One kind or two or more kinds of the alicyclic amines may be used.

Examples of the aromatic amines belonging to the monoamines include aniline, N-methyl aniline, N,N-dimethyl aniline, N-ethyl aniline, N,N-diethyl aniline, toluidine, benzyl amine and diphenyl amine. One kind or two or more kinds of the aromatic amines may be used.

Examples of polyamines of the aliphatic amines include ethylene diamine, diethylene diamine, triethylene diamine, hexamethylene diamine, dodecamethylene diamine, diethylene triamine, triethylene tetramine, tetraethylene pantamine, diethanol amine, triethtanol amine, N,N,N',N'-tetramethyl-1,4-butane diamine and N,N,N',N'-tetramethylethylene diamine.

Examples of the alicyclic polyamines include 1,8-diamino-p-menthane, 1,4-diaminocyclohexane. Examples of the aromatic polyamines include 2,4,6-triaminopyridine, 2,7-diaminofluorene and 9,10-diaminophenanthrene.

The nitrogen (N)-containing heterocyclic group of the nitrogen (N)-containing heterocyclic compound may be unsaturated group or saturated group, or may contain atoms other than the nitrogen atom. Examples of the unsaturated heterocyclic group include a pyrroyl group, an imidazoyl group, a pyrazoyl group, an isothiazoyl group, an isooxazoyl group, a pyridyl group, a pyrazinyl group, a pyrimidinyl group, a pyridazinyl group, an indolidinyl group, an isoindoyl group, an indoyl group, an isoazoyl group, a purinyl group, a quinolidinyl group, an isoqunioyl group, a quinoyl group, a phthalazinyl group, a naphthylidinyl group, a quinoxaquinidyl group, a quinoxazolinyl group, a cynoynyl group, a ferrizinyl group, a carbazole group, a carborynyl group, a phenanthrydinyl group, an actylinyl group, a perimydyl group, a phenanthroynyl group, a phenazinyl group, a phenothiazinyl group, a philazanyl group, a phenoxazinyl group, a pyrrolidinyl group, a pyrrolinyl group, an imidazolizinyl group, an imidazolynyl group, a pyrralizolidinyl group, a pyrrazolinyl group, a piperidyl group, a piperazinyl group, an indolinyl group, an isoindolinyl group, a quinuclidinyl group, a morpholinyl group, a 1-methyl imidazoyl group, a 1-ethyl imidazoyl group, a 1-propyl imidazoyl group, a pyridine group, an imidazole group, a thiazole group, an oxazole group and a triazole group. Examples of the saturated heterocyclic ring include a morpholine ring, a pyperidine ring and a pyperazine ring. Preferable heterocyclic rings include unsaturated heterocyclic rings with the pyridine and imidazole rings being more preferable. These heterocyclic rings may be substituted with alkyl groups such as methyl groups. Since the compounds having the pyridine rings has an ability to reduce the number of hydroxyl groups bound on the surface of the n-type semiconductor electrode (for example, an electrode containing $TiO_2$ as the n-type semiconductor), the solar cell can attain a high voltage.

Preferable examples of the nitrogen (N)-containing heterocyclic compounds include polyvinyl pyridine, polyvinyl imidazole, polybenzimidazole, bipyridyl, terpyridyl, polyvinyl pyrrole, 1,3,5-tris(3-dimethylamino)propyl hexahydro-1,3,5-triazine, tris-2-aminoethylamine, polydiallylmethyl amine, polyallyldimethyl amine, polydimethylallyl amine, polyallyl amine, polydimethylaminoethyl methylmethacrylate and polydimethylaminoethyl methacrylate.

While the compounds having the nitrogen (N)-containing heterocyclic group include those having the structures represented by the following chemical formula 1 to 9, the present invention is not restricted thereto.

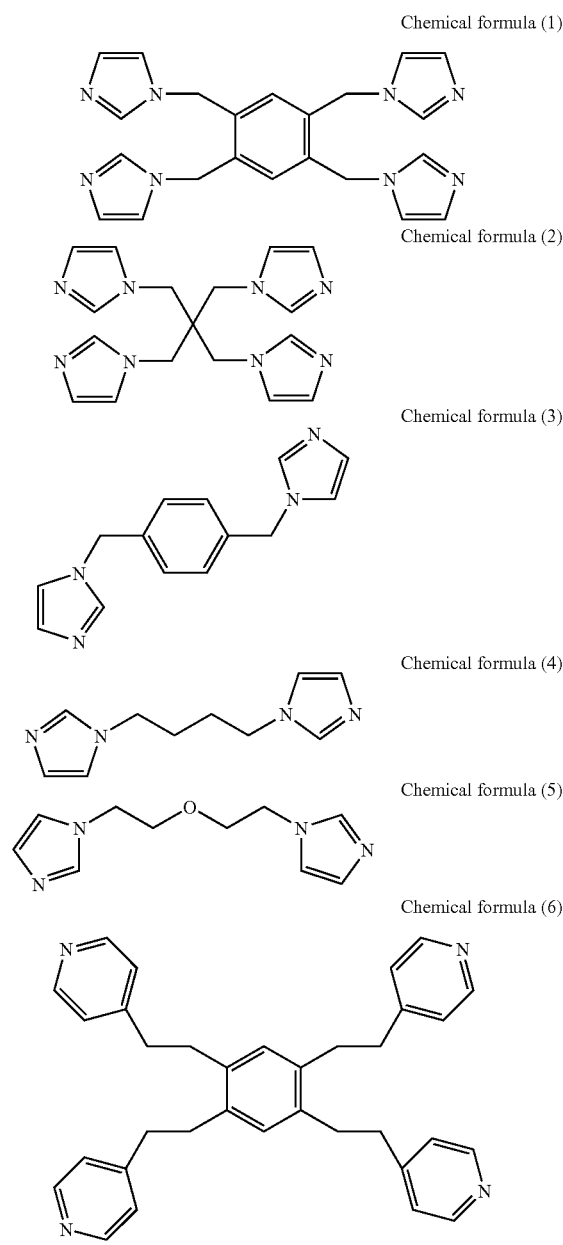

Chemical formula (1)

Chemical formula (2)

Chemical formula (3)

Chemical formula (4)

Chemical formula (5)

Chemical formula (6)

Chemical formula (7)

Chemical formula (8)

Chemical formula (9)

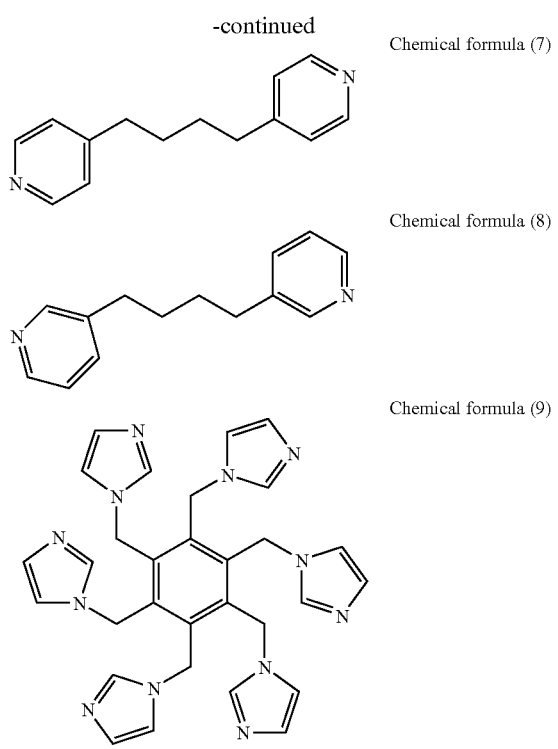

The weight average molecular weights of the aliphatic amine polymer, alicyclic amine polymer, aromatic amine polymer and nitrogen (N)-containing heterocyclic compound polymer are preferably in the range of 500 to 1,000,000 for the following reasons. These polymers may be insoluble in the electrolyte if the molecular weight is larger than 1,000,000. On the other hand, gelation may be difficult when the molecular weight of the acidic compound is small if the molecular weight is less than 500. The preferable range is 1000 to 300,000. The polymer may be a homopolymer having a single monomer polymerized, or a copolymer having two or more monomers polymerized. The copolymer may be either a random copolymer or a block copolymer.

Since the aliphatic amines having the long chain alkyl groups in the molecular frame, alicyclic amines having the long chain alkyl groups in the side chains, the aromatic amines or the nitrogen (N)-containing heterocyclic compounds have a low compatibility with the electrolyte to cause phase separation from the electrolyte, they can suppress gelation of the electrolyte composition at room temperature. Suppressing gelation at room temperature also permits gelation, in the process for allowing the electrolyte composition to permeate into the gap between the electrodes, to be avoided even when the reaction area of the electrode is increased. Also, gelation is accelerated by a heat treatment or the like at 50 to 200° C. after allowing the electrolyte composition to permeate into the entire electrode. Accordingly, the gel electrolyte can be evenly distributed even if the reaction area of the electrode is increased.

Substituted or non-substituted hydrocarbon groups having 8 to 30 carbon atoms are preferable as the long chain alkyl groups. The compound may comprise at least one, or two or more long chain alkyl groups. The hydrocarbon groups available may be branched or linear hydrocarbon groups such as octane, nonane, decane, undecane, dodecane, tridecane, tetradecane, pentadecane, hexadecane, heptadecane, octadecane, nonadecane, eicosane, heneicosane, docosane, tricosane, tetracosane, pentacosane, hexacosane, heptacosane, octacosane, nonacosane and triacosane, and compounds having a steroid frame such as cholesterol.

While preferable examples of the compounds having the long chain alkyl group are shown below, the present invention is not restricted thereto. These examples include N,N,N',N'-tetramethyl-1,8-diaminooctane, N,N,N',N'-tetramethyl-1,12-diamino dodecane, 1,12-diaminododecane, N,N-dimethylamino octadecane, 1-octadecyl imidazole, 2-octadecyl imidazole, bis(N,N,N',N'-tetradecylamino)cyclohexane, 4,4'-(N,N,N',N'-tetradodecylamino)dicyclohexyl methane and bis(N,N,N',N'-tetradodecylamino)-m-xylene.

The amine compounds having these long chain alkyl groups are featured in that reversible dissolution and precipitation are possible by heating and cooling. In the present invention, heating means a temperature range above room temperature, for example 40° C. or more and 150° C. or less, and cooling means a temperature of 150° C. or less, for example 80° C. or less, preferably 60° C. or less. Precipitation means that the amine compounds form colloids, micelles or crystals in the electrolyte, and the nitrogen atoms as reaction sites of the amine compounds may be isolated from a cross-linking agent as a counterpart of the gelling agent.

Any size of the precipitates of the amine compounds is acceptable so long as precipitation of the amine compounds is able to suppress cross-linking reactions. However, when the electrolyte is injected into the solar cell due to capillary action, the mean particle diameter of the amine compounds is preferably 100 μm or less, more preferably 30 μm or less, and particularly 10 μm or less, in order to improve diffusibility of the electrolyte. At least a part of the amine compounds in the form as described above may be dissolved in the electrolyte in the dissolution process. It is more desirable that an endothermic peak originating from dissolution of the amine compound in the electrolyte is confirmed by DSC (differential scanning calorimetric measurement).

The amine compounds encapsulated in micro-capsules can suppress gelation of the electrolyte composition at room temperature, since they have low compatibility with the electrolyte and manifest phase separation from the electrolyte. Suppressing gelation at room temperature can prevent the electrolyte composition from gelling at room temperature during the process for allowing the electrolyte composition to permeate into the electrodes even if the reaction area of the electrode is increased. Accordingly, gelation can be accelerated by applying a heat treatment at 50 to 200° C. after allowing the electrolyte composition to permeate into the entire electrode, thereby permitting the gel electrolyte to be evenly distributed even if the reaction area of the electrode is increased.

The amine compounds encapsulated in the micro-capsules known in the art are prepared, for example, by dispersing the amine compounds in an epoxy resin, followed by adding an isocyanate compound to form urethane micro-capsules encapsulating the amine compounds. An example of a commercially available encapsulated amine compound is "Novacure", from Ashahi Chemical Industry Co.

It is desirable to use polyfunctional compounds for at least one of the acidic compound and basic compound in the raw material kit for electrolyte composition and electrolyte composition according to the present invention. Such a constitution permits the polyfunctional compounds to perform a cross-linking reaction by a neutralizing reaction between the acidic compound and the basic compound, and the electrolyte composition is gelled by the cross-linked polyfunctional compound. The polyfunctional acidic compounds and the polyfunctional basic compounds desirably have a weight average molecular weight in the range of 500 to 1,000,000.

(Electrolyte)

The electrolyte contains iodine ($I_2$).

It is preferable that the electrolyte further contains reversible oxidation-reduction pairs comprising $I^-$ and $I_{3-}$. Such reversible oxidation-reduction pairs can be supplied from a mixture of iodine molecules ($I_2$) and iodides, for example.

The oxidation-reduction pairs desirably exhibit an oxidation-reduction potential 0.1 to 0.6V smaller than the oxidation-reduction potential of the dye to be described hereinafter. A reduction species such as $I^-$, for example, in the oxidation-reduction pairs having the oxidation-reduction potential 0.1 to 0.6V smaller than the oxidation-reduction potential of the dye, is able to accept positive holes from the oxidized dye. The charge transfer speed between the n-type semiconductor electrode and the conductive film may be increased by the electrolyte containing the oxidation-reduction pairs while enabling the open-end voltage to be increased.

The electrolyte desirably contains iodine ($I_2$) and iodides. Examples of the iodide include iodides of alkali metals, iodides of organic compounds and molten salts of iodides.

The molten salts of the iodide available include iodides of the nitrogen (N)-containing heterocyclic compounds such as imidazolium salts, pyridinium salts, quaternary ammonium salts, pyrrolidinium salts, pyrazolidinium salts, isochiazolidinuium salts and isooxazolidium salts.

Examples of the molten salts of iodides include those of 1-methyl-3-propylimidazolium iodide, 1,3-dimethylimidazolium iodide, 1-methyl-3-ethylimidazolium iodide, 1-methyl-3-pentylimidazolium iodide, 1-methyl-3-isopentylimidazolium iodide, 1-methyl-3-hexylimidazolium iodide, 1,2-dimethyl-3-propylimidazolium iodide, 1-ethyl-3-isopropylimidazolium iodide, 1-propyl-3-propylimidazolium iodide, pyrrolidinium iodide, ethylpyridinium iodide, butylpyridinium iodide, hexylpyridinium iodide and trihexylmethylammonium iodide. At least one of the molten salts of iodides selected from the compounds above may be used (Organic Solvent)

The raw material kit for electrolyte composition and the electrolyte composition may further comprise organic solvents. The electrolyte composition containing an organic solvent is readily allowed to permeate into the n-type semiconductor electrode due to the viscosity decreasing effect of the solvent. Further, the electrolyte composition enables ionic conductivity of the gel electrolyte to be increased.

A solvent that can exhibit excellent ionic conductance is desirably used, as this would enhance the mobility of ions due to its low viscosity, or increase the effective carrier concentration due to its high dielectric constant, or do both. Preferable examples of the solvents include carbonate esters such as ethylene carbonate and propylene carbonate; lactones such as γ-butylolactone, γ-valerolactone and δ-valerolactone; ethers such as 1,2-dimethoxyethane, diethoxyethane, ethyleneglycol dimethylether, polyethyleneglycol dimethylether and 1,4-dioxane; alcohols such as ethanol, ethyleneglycol monomethylether and polyethyleneglycol monoalkylether; glycols such as ethyleneglycol, propyleneglycol and polyethyleneglycol; tetrahydrofurans such as tetrahydrofuran and 2-methyl tetrahydrofuran; nitriles such as acetonitrile, glutarodinitrile, propionitrile, methoxyacetonitrile and benzonitrile; carboxylic acid esters such as methyl acetate, ethyl acetate and ethyl propionate; phosphoric acid triesters such as trimethyl phosphate and triethyl phosphate; heterocyclic compounds such as N-methylpyrrolidone, 2-methyl-1,3-dioxolan and sulforane; aprotic organic solvents such as dimethylsulfoxide, formamide, N,N-dimethylformamide and nitromethane. Two or more of these solvents may be mixed for use, if necessary.

The content of the organic solvent is preferably 65% by weight or less per 100% by weight of the total amount of the raw material kit for electrolyte composition or the total amount of the electrolyte composition. Gelation may be inhibited or the gel electrolyte may be remarkably denatured, if the content of the organic solvent exceeds 65% by weight. Therefore, the content of the organic solvent is preferably 1% by weight or more and 20% by weight or less.

(Water)

The electrolyte composition may contain water. The electrolyte composition containing water can further enhance the energy conversion efficiency of the dye sensitized solar cell.

The content of water in the electrolyte composition is preferably 10% or less by weight relative to 100% by weight of the combined amount of the molten iodide salts and water. The content of water is more preferably 0.01% or more by weight and 10% or less by weight, most preferably 0.5% or more by weight and 5% or less by weight, per 100% by weight of the combined amount of the molten salts of iodides and water.

An example of the dye sensitized solar cell according to the present invention will be described next.

The dye sensitized solar cell comprises: a substrate having a light receiving surface; a transparent conductive film formed on an inner face of the substrate; an n-type semiconductor electrode which is formed on the transparent conductive film and on the surface of which a dye is adsorbed; an opposed electrode comprising an opposed substrate and a conductive film formed on the the opposed substrate, the conductive film facing the n-type semiconductor electrode; and a gel electrolyte filled in a gap between the conductive film on the opposed electrode and n-type semiconductor electrode.

The gel electrolyte, transparent conductive film, n-type semiconductor electrode, dye, opposed substrate and conductive film will be described hereinafter.

1) Gel Electrolyte

The gel electrolyte contains gelling agent and an electrolyte that contains iodine. The gelling agent contains an organic salt generated from an acidic compound and a basic compound. The acidic compound contains at least one compound selected from a group consisting of sulfonic acid and carboxylic acid. The basic compound contains at least one compound selected from a group consisting of aliphatic amines, alicyclic amines, aromatic amines and nitrogen (N)-containing heterocyclic compounds. The organic salt is desirably a compound containing an atomic group that contains nitrogen atom and at least one atomic group selected from a group consisting of a sulfonic group and a carboxylic group.

Examples of the reaction for generating the organic salts are shown in the following chemical formula 10 and 11. Chemical formula 10 represents an organic salt generated by a reaction between polymethacrylic acid and 4,4'-bipyridyl.

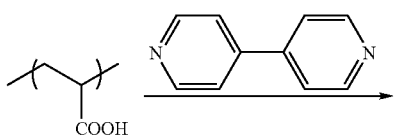

-continued

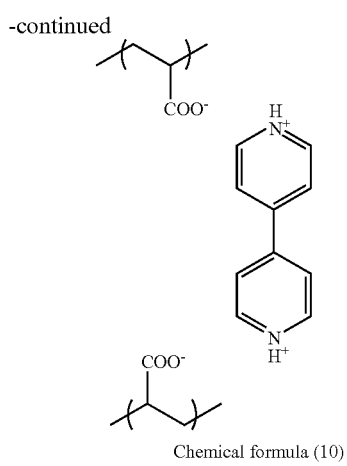

Chemical formula (10)

4,4'-Bipyridyl functions as a cross-linking agent with polymethacrylic acid, and cross-linking between two methacrylic acid molecules is possible, thereby obtaining an organic salt. Since the cross-linking reaction is based on an acid-base neutralization reaction, no catalyst is needed. Polymethacrylic acid and 4,4'-bipyridyl form an ionic bond, and therefore stability of the organic salts can be improved. As a result, the stability of the gel electrolyte at a high temperature can be improved.

Chemical formula 11 represents the structure formula of the organic salt generated by a reaction between polyvinyl pyridine and adipic acid.

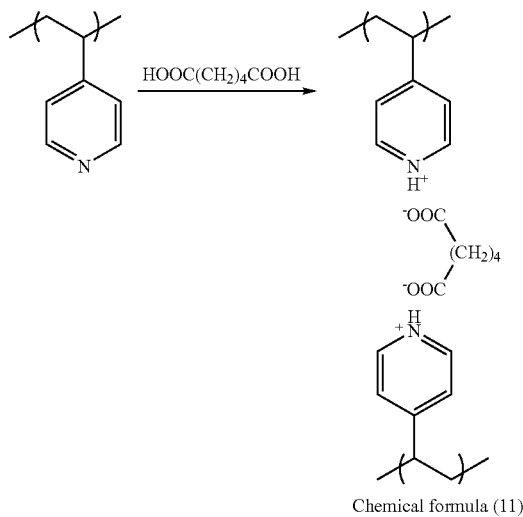

Chemical formula (11)

Adipic acid functions as a cross-linking agent with polyvinyl pyridine, and cross-linking between two pyridine molecules is possible, thereby obtaining an organic salt. No catalyst is needed because the cross-linking reaction is based on an acid-base neutralization reaction. Since polyvinyl pyridine and adipic acid form an ionic bond, stability of the organic salts can be improved. As a result, the stability of the gel electrolyte at a high temperature can be improved.

For example, the electrolyte composition is prepared by any one of the methods described in (a) to (f) above, followed by gelling the electrolyte composition to prepare the gel electrolyte.

2) Transparent Conductive Film

It is preferable that the transparent conductive film has a small absorbance in a visible light region while being conductive. Preferable transparent conductive films include a tin oxide film doped with fluorine or indium, and a zinc oxide film doped with fluorine or indium. A low resistance metal matrix is desirably disposed together with the transparent conductive film in order to improve conductivity and to prevent resistance from increasing.

3) n-Type Semiconductor Electrode

The n-type semiconductor electrode comprises preferably a transparent semiconductor having a small absorbance in a visible light region. A metal oxide semiconductor is preferable as the semiconductor described above. Examples of the metal oxide semiconductor include an oxide of a transition metal such as titanium, zirconium, hafnium, strontium, zinc, indium, yttrium, lanthanum, vanadium, niobium, tantalum, chromium, molybdenum or tungsten; a perovskite type oxide such as $SrTiO_3$, $CaTiO_3$, $BaTiO_3$, $MgTiO_3$ and $SrNb_2O_6$; a mixture of these complex oxides or oxides; and GaN.

Examples of the dye to be adsorbed on the surface of the n-type semiconductor electrode include a ruthenium-tris type transition metal complex, ruthenium-bis type transition metal complex, osmium-tris type transition metal complex, osmium-bis type transition metal complex, ruthenium-cis-diaqua-bipyridyl complex, phthalocyanine and porphylin.

4) Opposed Substrate

The opposed substrate preferably has a small absorbance in a visible light region with conductivity. A tin oxide film and zinc oxide film are preferably used for the substrate.

5) Conductive Film

The conductive film comprises a metal such as, for example, platinum, gold or silver.

The solar cell is manufactured by the methods (1) to (3) to be described below.

(1) Mixing Method

A cell unit is assembled. The cell unit comprises a substrate having a light receiving surface; a transparent conductive film formed on an inner face of the substrate; an n-type semiconductor electrode which is formed on the transparent conductive film and on the surface of which a dye is adsorbed; and an opposed electrode comprising an opposed substrate and a conductive film formed on the surface of the opposed substrate, the conductive film facing the n-type semiconductor electrode.

Then, the electrolyte composition prepared by any one of the methods described in (a) or (b) is injected into a gap between the n-type semiconductor electrode and the opposed substrate. Subsequently, a cell unit is tightly sealed, followed by gelling the electrolyte composition to obtain the dye sensitized solar cell according to the present invention.

(2) Dividing Method

The cell unit is assembled using the opposed electrode coated with the first raw material composition of the raw material kit described in (c) or (d). That is, the cell unit comprises a substrate having a light receiving surface; a transparent conductive film formed on an inner face of the substrate; an n-type semiconductor electrode which is formed on the transparent conductive film and on the surface of which a dye is adsorbed; and an opposed electrode arranged such that the surface coated with the first raw material composition faces the n-type semiconductor electrode.

Then, the second raw material composition of the raw material kit described in (c) or (d) is injected into a gap between the n-type semiconductor electrode and the opposed substrate. Subsequently, a cell unit is tightly sealed, followed by gelling the electrolyte composition to obtain the dye sensitized solar cell according to the present invention.

According to the method (2), the second raw material composition shows a lower viscosity than that of the electrolyte composition itself since no basic compound is contained. Consequently, the electrolyte can be promptly diffused into the electrode by injecting the second raw material composition into the gap between the n-type semiconductor electrode and the opposed substrate. Further, in the method (2), one gelling component (basic compound) previously coated on the opposed substrate is slowly dissolved into the electrolyte containing the other injected gelling agent (acidic compound), and a gelling reaction is proceeded. As a result, gelation is concentrated the conductive film on the opposed electrode, and the degree of gelation within the n-type semiconductor layer is lowered, and thereby the electrolyte is retained in the n-type semiconductor layer almost fluid state. Accordingly, there exists a little or less electro-chemically inert gelling component within the n-type semiconductor layer. The charge transfer speed within the n-type semiconductor layer is approximately equal to the charge transfer speed in the liquid electrolyte, with an improved energy conversion efficiency in the solar cell.

The third raw material composition described in (e) and (f) above may be used in place of the first raw material composition in the method (2). Alternatively, the fourth raw material composition described in (e) and (f) above may be used in place of the second raw material composition.

It is desirable to heat the cell unit for gelation in methods (1) and (2). The desirable heating temperature is within the range of 50 to 200° C., for the following reasons. A gelation accelerating effect may not be fully obtained when a heat treatment temperature is less than 50° C. When the heat treatment temperature exceeds 200° C., on the other hand, the dye becomes liable to decompose. A more preferable temperature range is 70 to 150° C.

(3) Another Method

The electrolyte composition is prepared by the method (a) or (b) described above. Method (b) is preferable. An electrolyte composition layer is formed by coating the electrolyte composition obtained on the n-type semiconductor electrode. The opposed electrode is laminated on the electrolyte composition layer, and a heat treatment is applied thereto, followed by gelling the electrolyte composition layer, thereby obtaining the dye sensitized solar cell according to the present invention. Alternatively, the electrolyte composition layer may be gelled by coating the electrolyte composition on the conductive film of the opposed electrode, laminating the n-type semiconductor electrode on the electrolyte composition layer obtained, and applying a heat treatment to the laminated layers.

(Function)

The raw material kit for electrolyte composition according to the present invention comprises two or more raw materials for obtaining the electrolyte composition. The two or more raw materials are not mixed with each other, or a part of them are mixed. Further, the two or more raw materials comprise an electrolyte containing iodine; an acidic compound containing at least one compound selected from a group consisting of sulfonic acid and carboxylic acid; and a basic compound containing at least one compound selected from a group consisting of aliphatic amines, alicyclic amines, aromatic amines and nitrogen (N)-containing heterocyclic compounds. Such a raw material kit is able to form a gel of the electrolyte composition in the presence of an electrolyte containing iodine.

In other words, in the method for synthesizing a polymer as a gelling agent known in the art, monomers are polymerized by radical or ionic chain reactions in the presence of a small amount of a catalyst. However, chain reaction polymerization does not occur in the presence of the electrolyte containing iodine, since the effect of radical generators or anionic polymerization initiators is not exhibited. Examples of the monomers as described above include acrylic resin and epoxy resin. In addition, there is a different synthetic method in which polymerization is proceeded by removing small molecular weight by-products such as water and alcohols as represented by an ester exchange reaction. Polyesters, polyamides and the like are synthesized by this method. However, the by-products formed in the polymerization reaction may adversely affect the electrolyte and dye molecules.

The acidic compound and basic compound generate an organic salt by a neutralization reaction, and the electrolyte composition is gelled by the organic salt generated. Since the reaction for generating the organic salt is based on the acid-base neutralization reaction, it occurs even in the presence of iodine, and no catalyst is required, and no by-product is formed. Accordingly, the solar cell comprising the gel electrolyte containing the organic salt as the gelling agent is able to improve the energy conversion efficiency.

The bond between the acidic compound and the basic compound in the organic salt is an ionic bond. Therefore, since the gelling agent containing the organic salt is stable even for long term use of the solar cell, or the temperature of the solar cell is elevated to about 50 to 70° C. by solar irradiation, phase transition of the gel electrolyte can be avoided. Consequently, leakage of liquid due to the temperature increase is prevented, while concurrently maintaining a high energy conversion efficiency even at the elevated temperature.

Examples of the present invention will be described in detail hereinafter with reference to drawings.

Example 1

A paste was produced by adding nitric acid to a high purity titanium oxide (anatase) powder having an average primary diameter of 30 nm, kneading those together with pure water, and stabilizing a resulting material by a surfactant. The paste was finely printed on a glass substrate by screen printing, and heat treatment was applied at a temperature of 450° C., thereby an n-type semiconductor electrode with a thickness of 2 μm comprising titanium oxide (anatase) was formed. Screen printing and heat treatment were repeated several times, and an n-type semiconductor electrode 4 with a thickness of 8 μm containing titanium oxide particles 3 was formed finally on a fluoride-doped tin oxide conductive film 2 as a transparent conductive film. The n-type semiconductor electrode 4 had a roughness factor of 1500. The roughness factor was determined from the amount of adsorbed nitrogen on a projected area of the substrate.

A ruthenium complex as a dye was retained on the surface of the n-type semiconductor electrode 4 by immersing the electrode in a $3 \times 10^{-4}$ M dry ethanol solution (temperature: about 80° C.) of cis-bis(thiocyanato)-N,N-bis(2,2'-bipyridyl-4,4'-dicarboxylic acid)-ruthenium (II) dihydrate followed by pulling up in an argon stream.

A glass substrate 7, on which a fluorine doped tin oxide electrode 6 (conductive film 6) with platinum was formed, thereby an opposed electrode 5 was obtained. The opposed electrode 5 was placed on the substrate 1 on which the n-type semiconductor electrode 4 was formed, using a spacer with a thickness of 30 μm. The two substrates were fixed to each other by applying an epoxy resin 8 to a peripheral portion except an electrolyte liquid inlet.

Figure 1C:
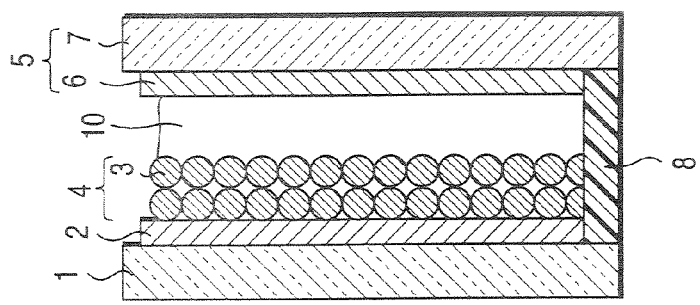
Figure 1B:
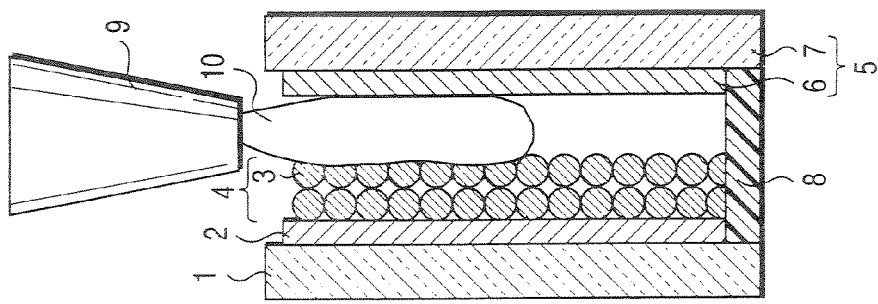
Figure 1A:
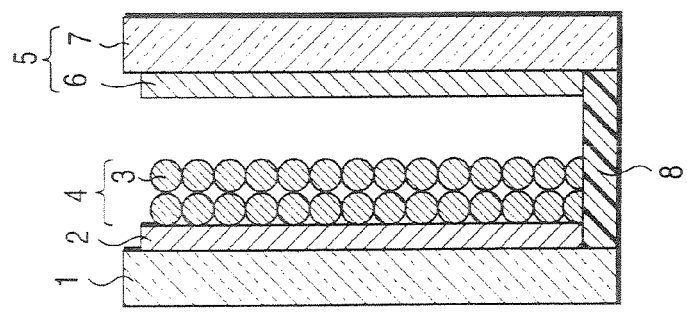

The cross section of a photovoltaic device unit obtained is shown in FIG. 1A.

An electrolyte was prepared by dissolving 0.5M of tetrapropylammonium iodide, 0.02M potassium iodide and 0.09M iodine in 1-methyl-3-propylimidazolium iodide. Dissolved in 5 g of the electrolyte obtained was 0.2 g of polyacrylic acid (molecular weight 250,000) as a polyfunctional acidic compound. Dissolved in the other 5 g of the electrolyte was 0.22 g of pyridine, as a monofunctional basic compound. Equal volumes of the two solutions obtained were mixed at room temperature by stirring, thereby obtaining an electrolyte composition.

As shown in FIGS. 1B and 1C, an electrolyte composition 10 was injected from an injection port 9 into the opening of the photovoltaic device unit. The electrolyte composition 10 is allowed to permeate into the n-type semiconductor electrode 4 and injected into the gap between the n-type semiconductor 4 and tin oxide electrode 6 (conductive film 6).

Figure 2:
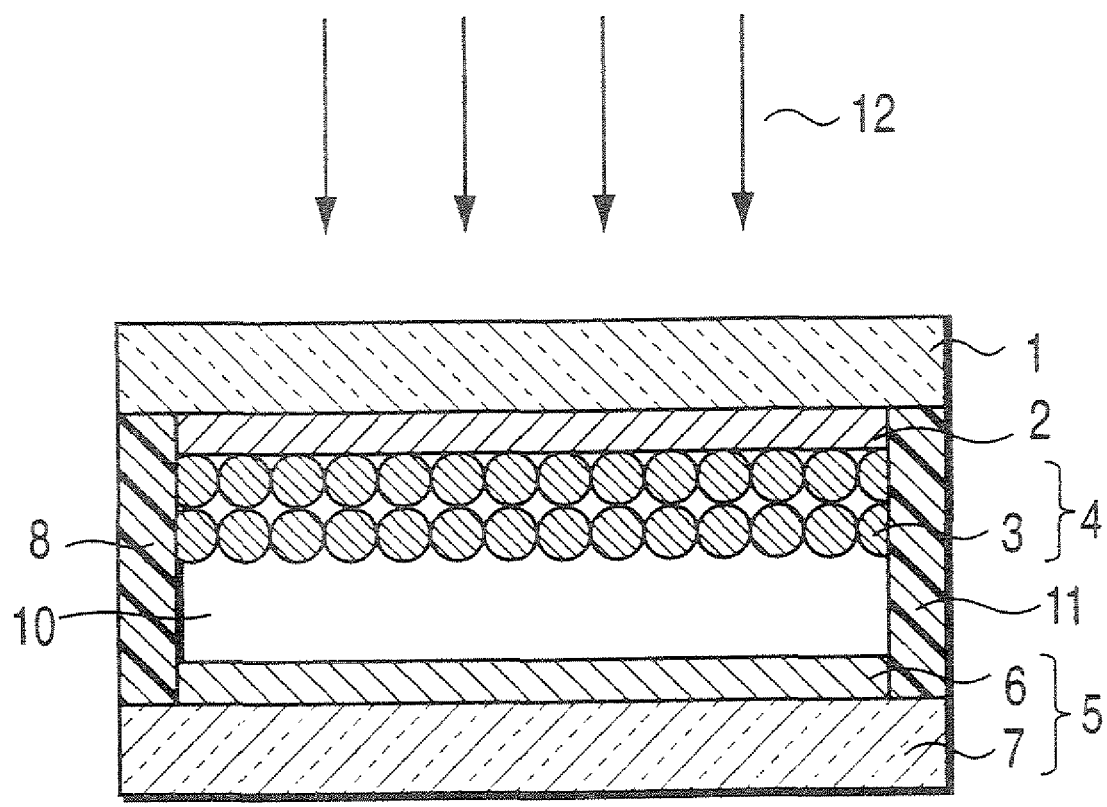
FIG. 2 is a cross section showing the dye sensitized solar cell in Example 1.

In the next step, the open portion of the photovoltaic device unit was sealed with an epoxy resin 11 as shown in FIG. 1(*d*), followed by heating on a hot plate at 60° C. for 30 minutes so as to obtain a photovoltaic device, i.e., a dye sensitized solar cell. FIG. 2 is a cross sectional view showing the solar cell thus obtained.

As shown in FIG. 2, a transparent conductive film 2 is formed on a glass substrate 1, and a transparent n-type semiconductor electrode 4 is formed on the transparent conductive film 2. The semiconductor electrode 4, which is an aggregate of fine particles 3, has a very large surface area. Also, a monomolecular layer of dye is formed on the surface of the transparent semiconductor electrode 4. It is possible for the surface of the transparent semiconductor electrode 4 to have a fractal shape having a self-similarity like a resin-like structure. A counter electrode 5 comprises a glass substrate 7 and a conductive film 6 formed on that surface of the glass substrate 7 which faces the semiconductor electrode 4. A gel electrolyte 10 is held in the pores of the semiconductor electrode 4 and is interposed between the semiconductor electrode 4 and the conductive film 6. In the photosensitized solar cell of the particular construction, light 12 incident on the glass substrate 1 is absorbed by the dye adsorbed on the surface of the n-type semiconductor electrode 4. Then, the dye delivers the electron to the n-type semiconductor electrode 4 and, at the same time, dye delivers the hole to the gel electrolyte 10, thereby performing the photovoltaic function.

Examples 2 and 3

A dye sensitized solar cell having the same constitution as that described in Example 1 was manufactured, except that N,N,N',N'-tetramethyl ethylenediamine (blending amount 0.32 g) and polyvinyl pyridine (molecular weight 20,000, blending amount 0.29 g) were used, respectively, in place of pyridine.

Examples 4 to 6

A dye sensitized solar cell having the same constitution as that described in Example 1 was manufactured, except that polymethacrylic acid (molecular weight 38,000, blending amount 0.23 g) was used in place of polyacrylic acid, and methyl imidazole (blending amount 0.23 g), 4,4'-bipyridyl (blending amount 0.43 g) and polyvinyl pyridine (molecular weight 20,000, blending amount 0.29 g) were used in place of pyridine.

Example 7

A dye sensitized solar cell having the same constitution as that described in Example 1 was manufactured, except that polystyrene sulfonic acid (molecular weight 460,000, blending amount 0.51 g) was used in place of polyacrylic acid, and the blending amount of pyridine was changed to 0.09 g.

Examples 8 and 9

A dye sensitized solar cell having the same constitution as that described in Example 1 was manufactured, except that polystyrene sulfonic acid (molecular weight 460,000, blending amount 0.51 g) was used in place of polyacrylic acid, and 4,4'-bipyridyl (blending amount 0.17 g) and polyvinyl pyridine (molecular weight 60,000, blending amount 0.11 g) were used, respectively, in place of pyridine.

Example 10

A dye sensitized solar cell having the same constitution as described in Example 1 was manufactured, except that an electrolyte composition to be described below was used.

The electrolyte composition was obtained by adding 0.2 g of polyvinyl pyridine (molecular weight 60,000) as a polyfunctional basic compound and 0.14 g of propionic acid as a monofunctional acidic compound were added to 10 g of the electrolyte as described in Example 1.

Examples 11 and 12

A dye sensitized solar cell having the same constitution as described in Example 10 was manufactured, except that adipic acid (0.28 g) and polyacrylic acid (molecular weight 27,000, blending amount 0.13 g) were used, respectively, in place of propionic acid.

Example 13

A dye sensitized solar cell having the same constitution as described in Example 10 was manufactured, except that polyvinyl imidazole (molecular weight 20,000, blending amount 0.2 g) was used in place of polyvinyl pyridine.

Examples 14 and 15

A dye sensitized solar cell having the same constitution as described in Example 13 was manufactured, except that adipic acid (0.28 g) and polyacrylic acid (molecular weight 27,000, blending amount 0.13 g) were used, respectively, in place of propionic acid.

Example 16

An n-type semiconductor electrode 4 retaining a ruthenium complex and an opposed electrode 5 were manufactured by the same method as described in Example 1.

Subsequently, 1 g of polyacrylic acid (made by Wake Pure Chemical Co., molecular weight 250,000) as a polyfunctional acidic compound was dissolved in 10 g of water. The solution obtained (first raw material composition) was coated on a conductive film 6 on the opposed electrode 5 with a thickness of 50 μm using a bar-coater. The coated layer was placed in an oven together with the electrode and was dried at 80° C. for one hour, thereby forming a layer 13 of the first raw material composition on the conductive film 6.

Then, the opposed electrode 5 having the layer 13 of the first raw material composition coated on the surface of the conductive film 6 is placed on a substrate 1 on which the n-type semiconductor electrode 4 is formed with interposition of a spacer with a thickness of 30 μm. The two substrates were fixed to each other by applying an epoxy resin 8 to a peripheral portion except an electrolyte liquid inlet.

An electrolyte was prepared, on the other hand, by dissolving 0.5M of tetrapropylammonium iodide, 0.02M of potassium iodide and 0.09M of iodine in 1-methyl-3-propylimidazolium iodide. A second raw material composition was obtained by dissolving 0.2 g of pyridine as a monofunctional basic compound in 10 g of the electrolyte.

As shown in FIGS. 3B and 3C, the second raw material composition 14 was injected into the opening of the photovoltaic device unit through an injection port 9. The second raw material composition 14 was allowed to permeate into the n-type semiconductor electrode 4 and injected into the gap between the n-type semiconductor electrode 4 and the tin oxide electrode 6 (conductive film 6).

Subsequently, after sealing the opening of the photovoltaic device unit with an epoxy resin 11 as shown in FIG. 3D, the layer 13 of the first raw material composition and the second raw material composition 14 were reacted by heating at 60° C. for 30 minutes on a hot plate to obtain a gel electrolyte 15, thereby preparing a photovoltaic device unit, namely a dye sensitized solar cell.

Examples 17 and 18

A dye sensitized solar cell having the same constitution as described in Example 16 was manufactured, except that N,N, N',N'-tetraethylenediamine (0.29 g) and polyvinyl pyridine (molecular weight 20,000, blending quantity 0.27 g) were used, respectively, in place of pyridine.

Examples 19 and 20

A dye sensitized solar cell having the same constitution as described in Example 16 was manufactured, except that dimethylcyclohexylamine (blending amount 0.32 g) as alicyclic amines and N,N'-dimethyl aniline (blending amount 0.31 g) as aromatic amines were used, respectively, in place of pyridine.

Example 21

A dye sensitized solar cell having the same constitution as described in Example 16 was manufactured, except that polystyrene sulfonic acid (molecular weight 460,000) was used in place of polyacrylic acid.

Examples 22 and 23

A dye sensitized solar cell having the same constitution as described in Example 21 was manufactured, except that 4,4'-bipyridyl (0.39 g) and polyvinyl pyridine (molecular weight 60,000, blending amount 0.27 g) were used, respectively, in place of pyridine.

Example 24

An n-type semiconductor electrode retaining an ruthenium complex and an opposed electrode were manufactured by the same method as described in Example 1.

Then, 1 g of polyvinyl pyridine (molecular weight 60,000) as a polyfunctional basic compound was dissolved in 10 g of water. The solution obtained (third raw material composition) was coated on the conductive film on the opposed electrode with a thickness of 50 μm using a bar-coater. The coating layer was placed in an oven together with the electrode, and was dried by heating at 80° C. for 1 hour, thereby forming a layer of the third raw material composition on the conductive film.

Subsequently, the opposed electrode having the layer of the third raw material composition coated on the surface of the conductive film was placed on the substrate on which the n-type semiconductor substrate was formed with interposition of a spacer with a thickness of 30 μm. The two substrates were fixed to each other by applying an epoxy resin 8 to a peripheral portion except an electrolyte liquid inlet.

An electrolyte was prepared, on the other hand, by dissolving 0.5M of tetrapropylammonium iodide, 0.02M of potassium iodine and 0.09M of iodine in 1-methyl-3-propylimidazolium iodide. A fourth raw material composition was obtained by dissolving 0.18 g of propionic acid as a monofunctional acidic compound in 10 g of the electrolyte.

The fourth raw material composition was injected from the injection port into the opening of the photovoltaic device unit. The fourth raw material composition is permeated into the n-type semiconductor electrode and injected into the gap between the n-type semiconductor electrode and the tin oxide electrode (conductive film).

After sealing the opening of the photovoltaic device unit with the epoxy resin, the unit was heated at 60° C. for 30 minutes on a hot plate, and a gel electrolyte was obtained by allowing the layer of the third raw material composition to react with the fourth raw material composition, thereby manufacturing a photovoltaic device unit, namely a dye sensitized solar cell.

Examples 25 and 26

A dye sensitized solar cell having the same constitution as described in Example 24 was manufactured, except that adipic acid (0.36 g) and polyacrylic acid (molecular weight 27,000, blending amount 0.18 g) were used, respectively, in place of propionic acid.

Comparative Example 1

An electrolyte composition was obtained by dissolving 0.2 g of polyacrylonitrile, which is a compound that forms a gel electrolyte by self-organization, into 10 g of the same electrolyte as described in Example 1.

The electrolyte composition was injected into the opening of the same photovoltaic device unit as described in Example 1. The electrolyte composition is allowed to permeate into the n-type semiconductor electrode and injected into the gap between the n-type semiconductor electrode and the tin oxide electrode (conductive film).

Subsequently, after sealing the opening of the photovoltaic device unit with an epoxy resin, the element was left to stand at room temperature for a while, thereby obtaining a photovoltaic device unit, namely a dye sensitized solar cell.

Comparative Example 2

An electrolyte composition was obtained by dissolving 0.2 g of polyacrylamide (molecular weight 10,000), which is a compound that forms a gel electrolyte by self-organization, into 10 g of the same electrolyte as described in Example 1.

A dye sensitized solar cell was manufactured by the same method as in Example 1, except that the electrolyte composition as described above was used.

Comparative Example 3

An electrolyte composition was obtained by dissolving 0.2 g of polyacrylic acid (molecular weight 250,000), which is a compound that forms a gel electrolyte by self-organization, into 10 g of the same electrolyte as described in Example 1.

A dye sensitized solar cell was manufactured by the same method as in Example 1, except that the electrolyte composition as described above was used.

Energy conversion efficiencies were determined with respect to the solar cells obtained in Examples 1 to 26 and Comparative Examples 1 to 3 when irradiating artificial sunlight with a luminous energy of 100 mW/cm$^2$. The results are shown in Tables 1 to 3. Then, energy conversion efficiencies were also determined when irradiating artificial sunlight with a luminous energy of 100 mW/cm$^2$ after storing the solar cells in Examples 1 to 26 and Comparative Examples 1 to 3 at 100° C. for 1 month. The energy conversion efficiencies obtained were compared with those before storage to determine the reduction ratios. The results are shown in Tables 1 to 3. The molecular weights listed in Tables 1 to 3 denotes weight average molecular weights.

TABLE 1

| Examples | Polyfunctional compound | Polyfunctional or monofunctional compound | Energy conversion efficiency (%) | Reduction ratio of energy conversion efficiency after storage at high temperature (%) |
|---|---|---|---|---|
| 1 | Polyacrylic acid (molecular weight 250,000) | Pyridine | 8 | 5 |
| 2 | Polyacrylic acid (molecular weight 250,000) | N,N,N',N'-tetramethyl ethylenediamine | 8 | 5.5 |
| 3 | Polyacrylic acid (molecular weight 250,000) | Polyvinyl pyridine (molecular weight 20,000) | 8 | 5.9 |
| 4 | Polymethacrylic acid (molecular weight 38,000) | Methyl imidazole | 7.5 | 6 |
| 5 | Polymethacrylic acid (molecular weight 38,000) | 4,4'-bipyridil | 7.5 | 6.2 |
| 6 | Polymethacrylic acid (molecular weight 38,000) | Polyvinyl pyridine (molecular weight 20,000) | 7.5 | 6.6 |
| 7 | Polystyrene sulfonic acid (molecular weight 460,000) | Pyridine | 7 | 7 |
| 8 | Polystyrene sulfonic acid (molecular weight 460,000) | 4,4'-bipyridil | 7 | 7.4 |
| 9 | Polystyrene sulfonic acid (molecular weight 460,000) | Polyvinyl pyridine (molecular weight 60,000) | 7 | 8 |
| 10 | Polyvinyl pyridine (molecular weight 60,000) | Propionic acid | 6 | 8 |
| 11 | Polyvinyl pyridine (molecular weight 60,000) | Adipic acid | 6 | 6 |
| 12 | Polyvinyl pyridine (molecular weight 60,000) | Polyacrylic acid (molecular weight 27,000) | 6 | 6 |
| 13 | Polyvinyl imidazole (molecular weight 20,000) | Propionic acid | 6 | 7 |
| 14 | Polyvinyl imidazole (molecular weight 20,000) | Adipic acid | 6 | 6 |
| 15 | Polyvinyl imidazole (molecular weight 20,000) | Polyacrylic acid (molecular weight 27,000) | 6 | 6 |

TABLE 2

(dividing method)

| Examples | Polyfunctional compound (opposed electrode side) | Polyfunctional or monofunctional compound (injection) | Energy conversion efficiency (%) | Reduction ratio of energy conversion efficiency after storage at high temperature (%) |
|---|---|---|---|---|
| 16 | Polyacrylic acid (molecular weight 250,000) | Pyridine | 8.5 | 4 |
| 17 | Polyacrylic acid (molecular weight 250,000) | N,N,N',N'-tetramethyl ethylenediamine | 8.5 | 4.4 |
| 18 | Polyacrylic acid (molecular weight 250,000) | Polyvinyl pyridine (molecular weight 20,000) | 8.5 | 4.8 |
| 19 | Polyacrylic acid (molecular weight 250,000) | Dimethylcyclohexyl amine | 7 | 5 |
| 20 | Polyacrylic acid (molecular weight 250,000) | N,N'-dimethylaniline | 7 | 5 |
| 21 | Polystyrene sulfonic acid (molecular weight 460,000) | Pyridine | 7 | 7 |

TABLE 2-continued (dividing method)

| Examples | Polyfunctional compound (opposed electrode side) | Polyfunctional or monofunctional compound (injection) | Energy conversion efficiency (%) | Reduction ratio of energy conversion efficiency after storage at high temperature (%) |
|---|---|---|---|---|
| 22 | Polystyrene sulfonic acid (molecular weight 460,000) | 4,4'-bipyridil | 7 | 7 |
| 23 | Polystyrene sulfonic acid (molecular weight 460,000) | Polyvinyl pyridine (molecular weight 60,000) | 7 | 6 |
| 24 | Polyvinyl pyridine (molecular weight 60,000) | Propionic acid | 6.5 | 7 |
| 25 | Polyvinyl pyridine (molecular weight 60,000) | Adipic acid | 6.5 | 7 |
| 26 | Polyvinyl pyridine (molecular weight 60,000) | Polyacrylic acid (molecular weight 27,000) | 6.5 | 6 |

TABLE 3

| Comparative examples | Physical gelling agent | Energy conversion efficiency (%) | Reduction ratio of energy conversion efficiency after storage at high temperature (%) |
|---|---|---|---|
| 1 | Polyacrylonitrile | 4 | 30 |
| 2 | Polyacrylamide (molecular weight 10,000) | 4 | 20 |
| 3 | Polyacrylic acid (molecular weight 250,000) | 4 | 30 |

Tables 1 to 3 clearly show that the solar cells in Examples 1 to 26 have higher energy conversion efficiencies and smaller degrees of reduction in the energy conversion efficiency at elevated temperatures as compared with the solar cells in Comparative Examples 1 to 3, the solar cells in Examples 1 to 26 showing excellent durability.

From comparisons of the solar cells in Examples 1 to 3 with the solar cells in Examples 16 to 18, it can be concluded that the solar cells obtained by the method of previously coating the gelling agent on one of the conductive films of the opposed electrode is excellent in durability as compared with the solar cells manufactured by injecting the electrolyte composition itself into the cell unit.

Paying attention to the differences in characteristics depending on the kind of the carboxylic acids, the results in Examples 1 to 9 and in Examples 16 to 23 show that durability becomes excellent in the order of polyacrylic acid>polymethacrylic acid>polystyrene sulfonic acid. On the other hand, using pyridine as the nitrogen (N)-containing heterocyclic compound gave excellent durability.

Examples 27 to 29

Examples for Verifying Effect of Phase Separation

A dye sensitized solar cell having the same constitution as described in Example 1 was manufactured, except that N,N,N',N'-tetramethyl-1,12-diaminododecane (0.64 g), 1,1'-(1,4-octadecanediil)bis(imidazole) (0.97 g) and a micro-capsule type amine compound (trade name HX3088 made by Asahi Chemical Co., blending amount 0.29 g) respectively, were used, respectively, in place of pyridine.

Energy conversion efficiencies were determined with respect to the solar cells obtained in Examples 27 and 29, and by irradiating artificial sunlight with a luminous energy of 100 mW/cm$^2$. The results are shown in Table 4. Then, energy conversion efficiencies were also determined when irradiating artificial sunlight with a luminous energy of 100 mW/cm$^2$ after storing these solar cells at 100° C. for 1 month. The energy conversion efficiencies obtained were compared with those before storage to determine the reduction ratios. The results are shown in Table 4. The results of Example 1 is also listed in Table 4.

The electrolyte compositions used in the solar cells in Examples 27 to 29 were placed at 25° C., and the time lapse before the viscosity of the electrolyte composition increases twice as much as the initial viscosity was measured. The results are shown in Table 4, wherein the time lapse before the viscosity of the electrolyte composition in Example 1 increases twice as much as the initial viscosity was defined as a unit "1".

Table 4

| Examples | Phase separation type amine compound | Carboxyl acid | Energy conversion efficiency (%) | Reduction ratio of energy conversion efficiency after storage at high temperature (%) | Time ratio before twice of initial viscosity |
|---|---|---|---|---|---|
| 27 | N,N,N',N'-tetramethyl-1,12-diaminododecane | Polyacrylic acid | 7 | 6 | 20 |
| 28 | 1,1'-(1,4-octadecanesiil)bis(imidazole) | Polyacrylic acid | 7 | 6 | 20 |
| 29 | Micro-capsule type amine compound | Polyacrylic acid | 7 | 6 | 30 |

Table 4-continued

| Examples | Phase separation type amine compound | Carboxyl acid | Energy conversion efficiency (%) | Reduction ratio of energy conversion efficiency after storage at high temperature (%) | Time ratio before twice of initial viscosity |
|---|---|---|---|---|---|
| 1 | Pyridine | Polyacrylic acid | 8 | 5 | 1 |

As shown in Table 4, the solar cells in Examples 27 to 29 are excellent in energy conversion efficiency and durability, and the gelling speed at room temperature is slower as compared with the solar cell in Example 1. When phase separation type amine compounds were used as in Examples 27 to 29, viscosity increment of the electrolyte composition at room temperature is effectively decreased or suppressed. Accordingly, the electrolyte composition containing the amine compound smoothly permeates during filling the cell. Consequently, the problems of unfilled portion of the cell caused by increasing the cell area is solved, and productivity becomes excellent since gelation of the electrolyte is rapidly proceeded by heating the cell at 80° C.

Examples 30 to 32

Examples for Verifying Effect of Phase Separation

A dye sensitized solar cell having the same constitution as described in Example 10 was manufactured, except that octadecane dicarboxylic acid (blending amount 0.59 g), stearic acid (blending amount 0.54 g) and cholic acid (blending amount 0.77 g) were used, respectively, in place of propionic acid.

Energy conversion efficiencies were determined with respect to the solar cells obtained in Examples 30 to 32 when irradiating artificial sunlight with a luminous energy of 100 mW/cm². The results are shown in Table 5. Then, energy conversion efficiencies were also determined when irradiating artificial sunlight with a luminous energy of 100 mW/cm² after storing the solar cells at 100° C. for 1 month. The energy conversion efficiencies obtained were compared with those before storage to determine the reduction ratios. The results are shown in Table 5. The result in Example 10 is also listed in Table 5.

The electrolyte compositions used in the solar cells in Examples 10 and 30 to 32 were placed at 25° C., and the time lapse before the viscosity of the electrolyte composition increased twice as much as the initial viscosity was measured. The results are shown in Table 5, wherein the time lapse before the viscosity of the electrolyte composition in Example 10 increased twice as much as the initial viscosity was defined as a unit "1".

TABLE 5

| Examples | Phase separation type carboxylic acid | Amine compound | Energy conversion efficiency (%) | Reduction ratio of energy conversion efficiency after storage at high temperature (%) | Time ratio before twice of initial viscosity |
|---|---|---|---|---|---|
| 30 | Octadecyl dicarboxylic acid | Polyvinyl pyridine | 7 | 8 | 20 |
| 31 | Stearic acid | Polyvinyl pyridine | 7 | 8 | 20 |
| 32 | Cholic acid | Polyvinyl pyridine | 7 | 8 | 20 |
| 10 | Propionic acid | Polyvinyl pyridine | 6 | 8 | 1 |

Table 5 clearly shows that the solar cells in Examples 30 to 32 are excellent in energy conversion efficiency and durability, and the gelling speed at room temperature is slow as compared with the solar cell in Example 10.

Example 33

An electrolyte was prepared by dissolving 0.5M of tetrapropylammonium iodide and 0.09M of iodine in 1-methyl-3-propylimidazolium iodide. Dissolved in 5 g of the electrolyte obtained was 0.2 g of polyacrylic acid (molecular weight 250,000) as a polyfunctional acidic compound. Dissolved in the other 5 g of the electrolyte was 0.22 g of pyridine, as a monofunctional basic compound. Equal volumes of the two solutions obtained were mixed at room temperature by stirring, thereby obtaining an electrolyte composition.

A dye sensitized solar cell was manufactured by the same method as described in Example 1, except that the electrolyte composition prepared as described above was used.

Example 34

Dissolved in 5 g of 10 g of the same kind of the electrolyte as described in Example 33 was 0.23 g of polymethacrylic acid (molecular weight 38,000) as a polyfunctional acidic compound. Dissolved in the other 5 g of the electrolyte was 0.23 g of methyl imidazole as a monofunctional basic compound. The solutions obtained were mixed in equal volumes at room temperature by stirring, thereby obtaining an electrolyte composition.

A dye sensitized solar cell was manufactured by the same method as described in Example 1, except that the electrolyte composition obtained above was used.

Example 35

Dissolved in 5 g of 10 g of the same kind of the electrolyte as described in Example 33 was 0.51 g of polystyrene sulfonic acid (molecular weight 460,000) as a polyfunctional acidic compound. Dissolved in the remaining 5 g of electrolyte was 0.09 g of pyridine as a monofunctional basic compound. Equal volumes of the two solutions obtained were mixed at room temperature by stirring, thereby obtaining an electrolyte composition.

A dye sensitized solar cell was manufactured by the same method as described in Example 1, except that the electrolyte composition obtained above was used.

Example 36

Dissolved in 5 g of 10 g of the same kind of the electrolyte as described in Example 33 was 0.2 g of polyvinyl pyridine (molecular weight 60,000) as a polyfunctional basic compound. Dissolved in the remaining 5 g of electrolyte was 0.14 g of propionic acid as a monofunctional acidic compound. Equal volumes of the two solutions obtained were mixed at room temperature by stirring, thereby obtaining an electrolyte composition.

A dye sensitized solar cell was manufactured by the same method as described in Example 1, except that the electrolyte composition obtained above was used.

Example 37

Dissolved in 5 g of 10 g of the same kind of the electrolyte as described in Example 33 was 0.2 g of polyvinyl imidazole (molecular weight 20,000) as a polyfunctional basic compound. Dissolved in the remaining 5 g of electrolyte was 0.13 g of polyacrylic acid (molecular weight 27,000) as a monofunctional acidic compound. Equal volumes of the two solutions obtained were mixed at room temperature by stirring, thereby obtaining an electrolyte composition.

A dye sensitized solar cell was manufactured by the same method as described in Example 1, except that the electrolyte composition obtained above was used.

Energy conversion efficiencies were determined with respect to the solar cells obtained in Examples 33 to 37 when irradiating artificial sunlight with a luminous energy of 100 mW/cm$^2$. The results are shown in Table 6. Then, energy conversion efficiencies were also determined when irradiating artificial sunlight with a luminous energy of 100 mW/cm$^2$ after storing the solar cells at 100° C. for 1 month. The energy conversion efficiencies obtained were compared with those before storage to determine the reduction ratios. The results are shown in Table 6. The results in Example 1, 4, 7, 10 and 15 are also listed in Table 6.

TABLE 6

(mixing method)

| | Polyfunctional compound | Polyfunctional or monofunctional compound | Energy conversion efficiency (%) | Reduction ratio of energy conversion efficiency after storage at high temperature (%) |
|---|---|---|---|---|
| Example 33 | Polyacrylic acid (molecular weight 250,000) | Pyridine | 7.8 | 4 |
| Example 1 | Polyacrylic acid (molecular weight 250,000) | Pyridine | 8 | 5 |
| Example 34 | Polymethacrylic acid (molecular weight 38,000) | Methyl imidazole | 8 | 6 |
| Example 4 | Polymethacrylic acid (molecular weight 38,000) | Methyl imidazole | 7.5 | 6 |
| Example 35 | Polystyrene sulfonic acid (molecular weight 460,000) | Pyridine | 7.6 | 7 |
| Example 7 | Polystyrene sulfonic acid (molecular weight 460,000) | Pyridine | 7 | 7 |
| Example 36 | Polyvinyl pyridine (molecular weight 60,000) | Propionic acid | 7.7 | 7 |
| Example 10 | Polyvinyl pyridine (molecular weight 60,000) | Propionic acid | 6 | 8 |
| Example 37 | Polyvinyl imidazole (molecular weight 20,000) | Polyacrylic acid (molecular weight 27,000) | 7 | 5 |
| Example 15 | Polyvinyl imidazole (molecular weight 20,000) | Polyacrylic acid (molecular weight 27,000) | 6 | 6 |

Example 38

A dye sensitized solar cell was manufactured by the same method as described in Example 16, except that the layer of the first raw material composition and the second raw material composition were prepared by the methods as described below.

Dissolved in 10 g of 1-methyl-3-propylimidazolium iodide were 0.15 g of iodine and 0.5 g of polyacrylic acid (made by Wako Pure Chemical Co., molecular weight 250,000). The solution obtained (first raw material composition) was coated on a conductive film on the opposed electrode with a thickness of 10 μm using a bar-coater to form the layer of the first raw material composition on the conductive film.

On the other hand, dissolved in 1-methyl-3-propylimidazolium iodide were 0.5M of tetrapropylammonium iodide and 0.09M of iodine to prepare an electrolyte. Into 10 g of the electrolyte, 0.2 g of pyridine as a monofunctional basic compound was dissolved to obtain the second raw material composition.

Example 39

A dye sensitized solar cell was manufactured by the same method as described in Example 16, except that the layer of the first raw material composition was prepared by the method as described below, and the composition as described in Example 38 was used as the second raw material composition.

mW/cm$^2$. The results are shown in Table 7 below. Then, energy conversion efficiencies were also determined when irradiating artificial sunlight with a luminous energy of 100 mW/cm$^2$ after storing the solar cells at 100° C. for 1 month. The energy conversion efficiencies obtained were compared with those before storage to determine the reduction ratios. The results are shown in Table 7. The results in Example 16, 23 and 25 are also listed in Table 7.

TABLE 7

(dividing method)

| | Polyfunctional compound (opposed electrode side) | Polyfunctional or monofunctional compound (injection) | Energy conversion efficiency (%) | Reduction ratio of energy conversion efficiency after storage at high temperature (%) |
|---|---|---|---|---|
| Example 38 | Polyacrylic acid (molecular weight 250,000) | Pyridine | 8.8 | 3.8 |
| Example 16 | Polyacrylic acid (molecular weight 250,000) | Pyridine | 8.5 | 4 |
| Example 39 | Polystyrene sulfonic acid (molecular weight 460,000) | Polyvinyl pyridine (molecular weight 60,000) | 8.7 | 5 |
| Example 23 | Polystyrene sulfonic acid (molecular weight 460,000) | Polyvinyl pyridine (molecular weight 60,000) | 7 | 6 |
| Example 40 | Polyvinyl pyridine (molecular weight 60,000) | Adipic acid | 7 | 5 |
| Example 25 | Polyvinyl pyridine (molecular weight 60,000) | Adipic acid | 6.5 | 7 |

Dissolved in 10 g of 1-methyl-3-propylomidazolium iodide were 0.15 g of iodine and 0.5 g of polystyrene sulfonic acid (molecular weight 460,000) as a polyfunctional acidic compound. The solution obtained (first raw material composition) was coated on the conductive film on the opposed electrode with a thickness of 10 μm using a bar-coater to form the layer of the first raw material composition on the conductive film.

Example 40

A dye sensitized solar cell was manufactured by the same method as described in Example 24, except that a layer of the third raw material composition and the fourth raw material composition were prepared, respectively, by the method as described below.

Dissolved in 10 g of 1-methyl-3-propylomidazolium iodide were 0.15 g of iodine and 0.5 g of polyvinyl pyridine (molecular weight 60,000) as a polyfunctional basic compound. The solution obtained (third raw material composition) was coated on the conductive film on the opposed electrode with a thickness of 10 μm using a bar-coater to form the layer of the third raw material composition on the conductive film.

An electrolyte was prepared, on the other hand, by dissolving 0.5M of tetrapropylammonium iodide and 0.09M of iodine in 1-methyl-3-propylimidazolium iodide. The fourth raw material composition was obtained by dissolving 0.36 g of adipic acid as a monofunctional acidic compound in 10 g of the electrolyte.

Energy conversion efficiencies were determined with respect to the solar cells obtained in Examples 38 to 40 when irradiating artificial sunlight with a luminous energy of 100

While it has been described that solar light is irradiated from the n-type semiconductor electrode side in the foregoing examples, the solar cell may be constituted such that solar light is irradiated from the opposed electrode side.

As described above, the present invention provides a raw material kit for electrolyte composition by which the solar cell can attain a high energy conversion efficiency even at high temperatures.

The present invention also provides an electrolyte composition by which the solar cell can attain a high energy conversion efficiency even at high temperatures.

The present invention further provides a dye sensitized solar cell capable of attaining a high energy conversion efficiency even at high temperatures, and a method for manufacturing the dye sensitized solar cell.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for manufacturing a dye sensitizing solar cell, comprising:

coating a first raw material composition on a surface of an opposed electrode, the first raw material composition including an acidic compound that contains at least one compound selected from a group consisting of sulfonic acid and carboxylic acid;

assembling a cell unit which comprises the opposed electrode and an n-type semiconductor electrode that contains a dye, the surface of the opposed electrode facing the n-type semiconductor electrode;

injecting a second raw material composition containing a basic compound and at least one part of an electrolyte that contains iodine into a gap between the n-type semiconductor electrode and the opposed electrode, the basic compound containing at least one compound selected from a group consisting of aliphatic amines, alicyclic amines, aromatic amines and N-containing heterocyclic compounds; and obtaining a gel electrode by allowing the first raw material composition to react with the second raw material composition.

2. The method for manufacturing a dye sensitized solar cell according to claim 1, wherein the second raw material composition contains one part of the electrolyte, and the first raw material composition is prepared by allowing the acidic compound to dissolve in the other part of the electrolyte.

3. The method for manufacturing a dye sensitized solar cell according to claim 1, wherein the sulfonic acid and the carboxylic acid are respectively polyfunctional compounds having a weight average molecular weight of 500 to 1,000,000, and the aliphatic amines, the alicyclic amines, the aromatic amines and the N-containing heterocyclic compounds are respectively monofunctional compounds.

4. A method for manufacturing a dye sensitized solar cell, comprising:

coating a first raw material composition including a basic compound on a surface of an opposed electrode, the basic compound containing at least one compound selected from a group consisting of aliphatic amines, alicyclic amines, aromatic amines and N-containing heterocyclic compounds;

assembling a cell unit which comprises the opposed electrode and an n-type semiconductor electrode that contains a dye, the surface of the opposed electrode facing the n-type semiconductor electrode;

injecting a second raw material composition containing an acidic compound and at least one part of an electrolyte that contains iodine into a gap between the n-type semiconductor electrode and the opposed electrode, the acidic compound containing at least one compound selected from a group consisting of sulfonic acid and carboxylic acid; and obtaining a gel electrode by allowing the first raw material composition to react with the second raw material composition.

5. The method for manufacturing a dye sensitized solar cell according to claim 4, wherein the second raw material composition contains one part of the electrolyte, and the first raw material composition is prepared by dissolving the basic compound in the other part of the electrolyte.

6. The method for manufacturing a dye sensitized solar cell according to claim 4, wherein the sulfonic acid and the carboxylic acid are respectively monofunctional compounds, and the aliphatic amines, the alicyclic amines, the aromatic amines and the N-containing heterocyclic compounds are respectively polyfunctional compounds having a weight average molecular weight of 500 to 1,000,000.

\* \* \* \* \*